Figures 1, 5:
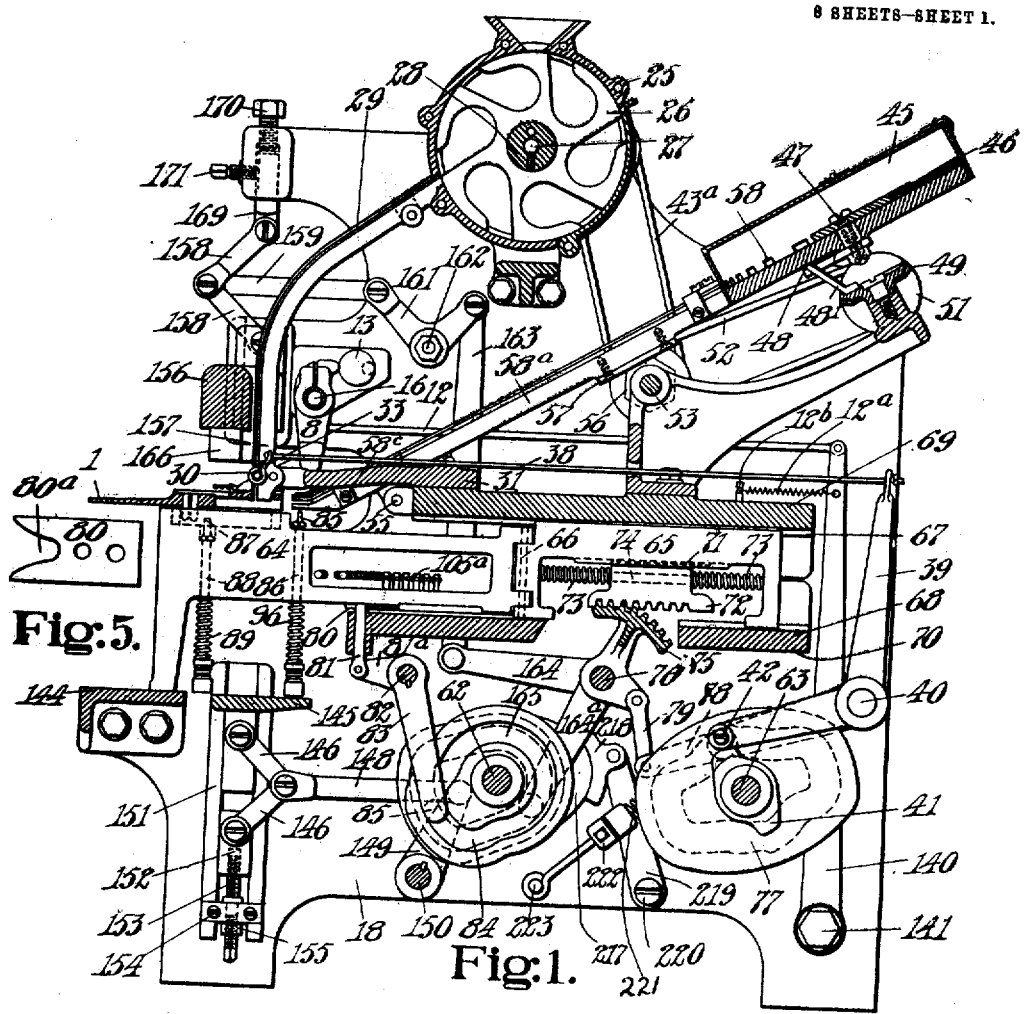

R. C. SIMMONS.
HOOK AND EYELET SETTING MACHINE.
APPLICATION FILED MAY 3, 1909.

1,117,711.

Patented Nov. 17, 1914.
6 SHEETS—SHEET 1.

WITNESSES
Elizabeth C. Coupe
Edith C. Hollbrook

INVENTOR
Ralph C. Simmons

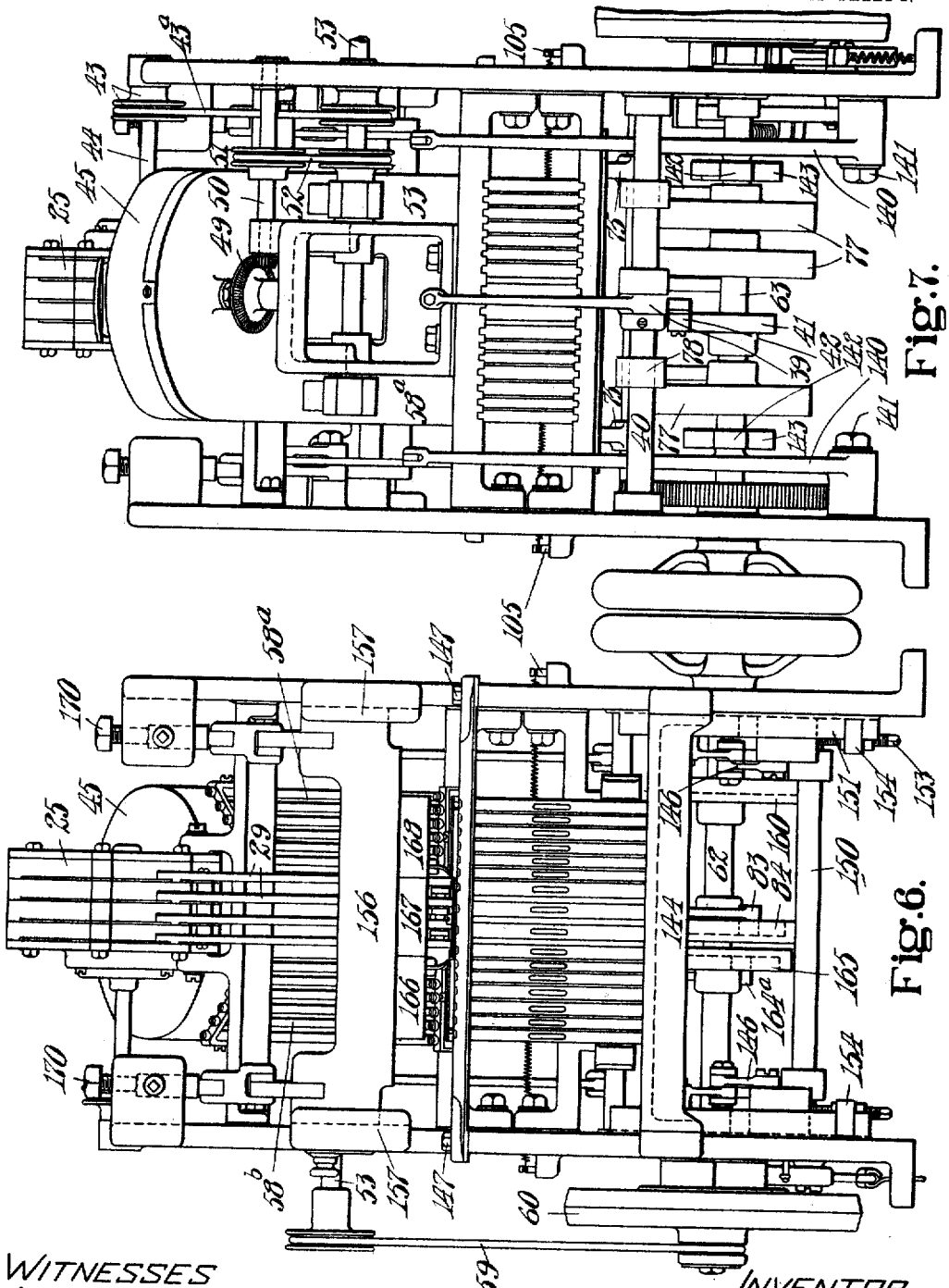

R. C. SIMMONS.
HOOK AND EYELET SETTING MACHINE.
APPLICATION FILED MAY 3, 1909.

1,117,711.

Patented Nov. 17, 1914.
8 SHEETS—SHEET 3.

WITNESSES
Elizabeth C. Coyle
Edith C. Holbrook

INVENTOR
Ralph C. Simmons
By his Attorney,
Nelson M Howard

R. C. SIMMONS.
HOOK AND EYELET SETTING MACHINE.
APPLICATION FILED MAY 3, 1909.

1,117,711.

Patented Nov. 17, 1914.
8 SHEETS—SHEET 4.

WITNESSES
Elizabeth C. Coupe
Edith C. Holbrook

INVENTOR
Ralph C. Simmons
By his Attorney
Nelson Morand

R. C. SIMMONS.
HOOK AND EYELET SETTING MACHINE.
APPLICATION FILED MAY 3, 1909.

1,117,711. Patented Nov. 17, 1914.
8 SHEETS—SHEET 5.

WITNESSES
Elizabeth C. Coupe
Edith C. Holbrook

INVENTOR
Ralph C. Simmons
By his Attorney,
Nelson W. Howard

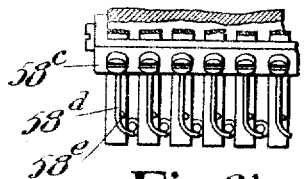
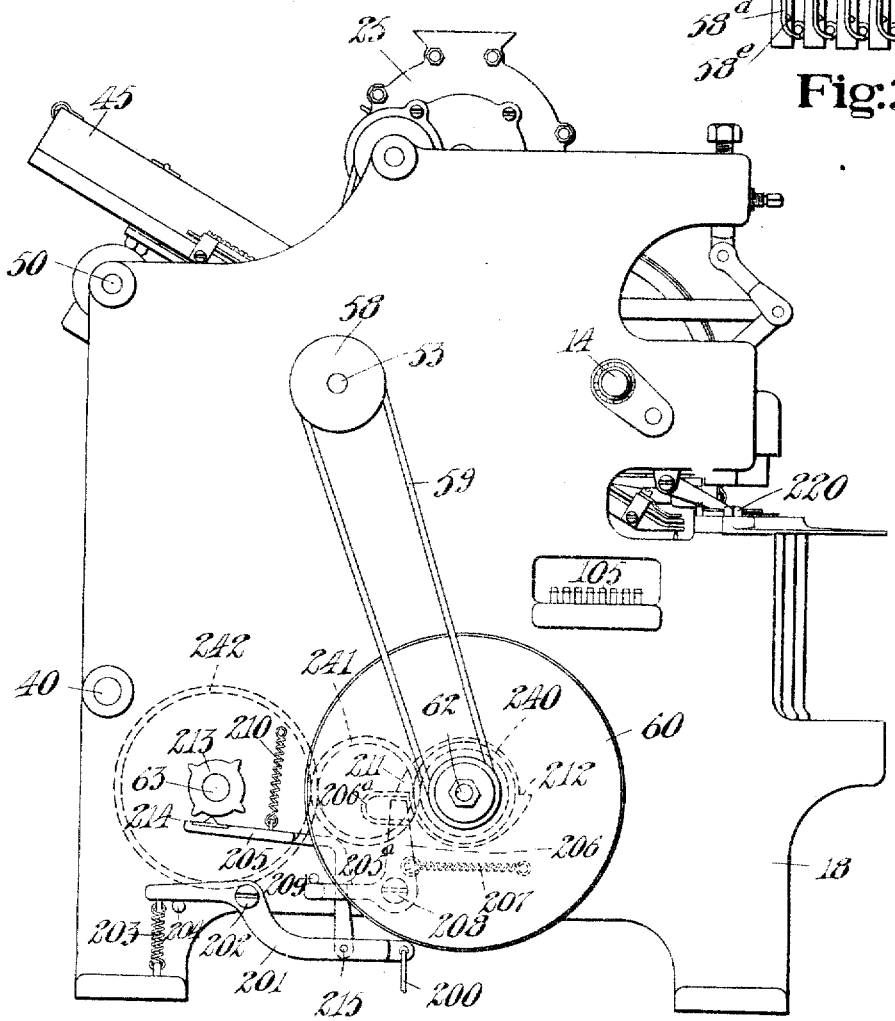

R. C. SIMMONS.
HOOK AND EYELET SETTING MACHINE.
APPLICATION FILED MAY 3, 1909.

1,117,711.

Patented Nov. 17, 1914.

8 SHEETS—SHEET 8.

WITNESSES
Elizabeth C. Coyle
Edith C. Holbrook

INVENTOR
Ralph C. Simmons
By his Attorney
Nelson Howard

UNITED STATES PATENT OFFICE.

RALPH C. SIMMONS, OF BEVERLY, MASSACHUSETTS, ASSIGNOR TO UNITED SHOE MACHINERY COMPANY, OF PATERSON, NEW JERSEY, A CORPORATION OF NEW JERSEY.

HOOK AND EYELET SETTING MACHINE.

1,117,711.  Specification of Letters Patent.  Patented Nov. 17, 1914.

Application filed May 3, 1909. Serial No. 493,675.

*To all whom it may concern:*

Be it known that I, RALPH C. SIMMONS, a citizen of the United States, residing at Beverly, in the county of Essex and State of Massachusetts, have invented certain Improvements in Hook and Eyelet Setting Machines, of which the following description, in connection with the accompanying drawings, is a specification, like reference characters on the drawings indicating like parts in the several figures.

This invention relates to machines for setting fasteners, such as eyelets, lacing hooks, rivets or the like, and more particularly to machines for setting a plurality of different kinds of fasteners in the quarters of boots and shoes.

Heretofore when it was desired to set more than one kind of fastener, as, for instance, eyelets and lacing hooks, or a plurality of different styles or sizes of eyelets, the customary plan has been to set the eyelets and lacing hooks, or the different styles or sizes of eyelets, on independent machines, each of which required the attention of an operative. Consequently, in such cases it was necessary, where eyelets and lacing hooks were to be set in shoe quarters, to handle each quarter twice in order to supply it with its appropriate number of these fastenings. Where, as in the case of some shoes, in order to improve the appearance of the shoe, or for other reasons, it was proposed to dispense with the usual row of lacing hooks and in lieu thereof to supply the shoe with eyelets of a given style or size along one part of the edge of the quarter and with eyelets of another style or size along a different part of such edge, it also was customary to use independent machines, one for each type of eyelet to be set, and every quarter in such case had to be handled as many times as there were machines for the several kinds of fasteners. The practice of setting these several kinds of fasteners on independent machines not only involved more expense but necessarily consumed more time than would be the case where all of such fasteners were set on a single machine, and hence it will be obvious that a practical machine whose organization was such as to render it capable of setting automatically all of the lacing hooks and eyelets, or a plurality of kinds of eyelets, or other fasteners, simultaneously in the quarters of boots and shoes, would combine the desirable qualities of speed and economy to a degree hitherto unknown in this art.

It is accordingly a very important object of the present invention to produce a machine which will be so constructed as to set a plurality of different kinds of fasteners of the character above referred to, at a single operation, in boots and shoes, or in other articles, and which will require a minimum amount of attention on the part of the operator.

The invention is herein shown as embodied in a machine of the gang type, and while in the preferred form the machine is arranged to set a group of eyelets and a group of lacing hooks simultaneously in the material, it is equally within the scope of the invention to so construct the setting mechanism of the machine that it will set independent groups of different styles of eyelets, or other similar fasteners, simultaneously therein; it is also to be understood that the embodiment of the invention in a machine of the gang type is illustrative only, and that many features of the invention are capable of use in machines that set single fasteners, or that set any desired proportionate numbers of a plurality of kinds of fasteners in material, and the invention is not restricted to the particular type of machine, nor to the number or kinds of fasteners to be set. Preferably, also, in the embodiment referred to the eyelet setting devices are arranged in two gangs and the hook setting devices are arranged in a single gang located between the gangs of eyelet setting devices, whereby the right hand half of a quarter may be positioned with reference to one of the gangs of eyelet setting devices and the hook setting devices, and the left hand half of a quarter may be positioned with reference to the other gang of eyelet setting devices and the hook setting devices, the several parts of the machine being constructed and arranged to first actuate the gang of hook setting devices with one of the gangs of eyelet setting devices and then the gang of hook setting devices with the other gang of eyelet setting devices, alternately. This enables the attendant to present the right and left hand quarters of shoes to the machine in alternation, the parts being so organized that the machine will automatically set the eyelets and hooks for each of said quarters at the proper points thereon, and at a single operation in each instance. In connection with this arrangement I prefer to employ suitable gages to properly locate the quarters with reference to the setting devices, one gage being provided for each of the gangs of eyelet setting devices and being so located as to coöperate with the extreme outer edge of a right hand or a left hand quarter, respectively, other gages being provided, one to coöperate with the extreme inner edge of a right hand quarter, and the other to coöperate with the extreme inner edge of a left hand quarter, suitable automatic mechanism being connected with the latter gages and serving to withdraw and advance the same alternately to and from position, whereby the gage which is out of operative position will not obstruct or interfere with the presentation of a quarter to the other of said gages. Preferably, also, adjusting means is employed in connection with such mechanism to control the amount of forward movement of these gages, whereby the position of the work relatively to the setting devices may be determined. The parts are so timed that when the eyelet setting devices for a right hand quarter are in operation the appropriate gage therefor is advanced to position and the gage for the left hand quarter is withdrawn, and vice versa.

In connection with each of the several gangs of setting devices above referred to, and to coöperate therewith, is preferably employed an anvil, shown herein in the form of a plate, and under one arrangement of the invention the anvil plate for the hook setting devices is arranged below the plane of the anvil plate for the eyelet setting devices, so as to permit the leather and lining to be located upon its opposite sides, while both the leather and lining may be located below the anvil plates for the eyelet setting devices. By this arrangement the machine sets blind hooks, or hooks that are set through the leather only, while the eyelets are set through both the leather and lining; but, while preferred, the invention is not limited to this form, as I may employ a single anvil plate which will be common to the several gangs and will enable the hooks as well as the eyelets to be set through all of the layers of material, or any number of such layers.

A further feature of importance in connection with the setting devices and their anvils, is a work support to sustain the material which receives the fastenings the same being preferably located in position and serving to support the anvils, and being, furthermore, under one form of the invention, constructed with grooves or similar clearance spaces whereby to prevent the fasteners when set from interfering with the ready removal of said material from the work support.

Still another important feature of the invention lies in a construction and arrangement of parts whereby the setting devices and their punches are mounted for movements into and out of operative positions, which includes an improved means for permitting the adjustment of the lateral spacing of said devices so as to vary the distance between the fasteners being set. As herein illustrated, the machine is provided with a plurality of movable carriers each comprising two members, connected for lateral movements relatively to each other, one of said members carrying a punch and setting device, and the other of said members having connected thereto suitable actuating mechanism.

A desirable form of actuating mechanism would comprise a series of segmental gears, one for each of the gangs of setting devices, to be driven by suitable mechanism from the main power shaft, said gears being in mesh with movable racks which are arranged for sliding movements on guides supported by the said members, whereby, when oscillating movements are imparted to said gears the carriers will move to and fro to carry the punches and setting devices into and out of stock-punching, and fastener-receiving and setting positions, respectively; and in order to provide for the varying distances to be traveled by the hook and eyelet setting devices in said movements which is necessitated by the curvatures of the front edges of shoe quarters, yielding means may be interposed between said racks and said members of the carrier. Preferably, the actuated members of the carriers are each provided with a recess of a form and size to coöperate with two pins, or other like stop devices, located on the work support and so arranged as to limit the movements of the carrier in opposite directions, whereby to determine the operative position for the punch, and the operative position for the setting device, respectively. Each of said carriers is also adapted to be stopped in an intermediate position between those above referred to in order to permit its setting device to receive fasteners from the raceway, and for this purpose a stop is provided which is arranged to be projected by suitable mechanism so as to arrest the movement of the carrier at the proper time, and to be withdrawn for permitting the movements of the carrier beyond the intermediate position to either of its other positions, as hereinbefore referred to.

By reason of the movable connection between the members of the carrier, the outer or freely movable members carrying the punches and setting devices may swing or move laterally, and the lateral positions of said members are, preferably, controlled by yielding means, such as springs, which may extend from a suitable point on the members to a fixed part of the machine and will act to hold the sides of the recesses of said members against the stop pins hereinbefore described. By this arrangement the spacing of the fasteners, and also the character of the curve upon which they are set, may be altered by substituting for the work support in use an interchangeable work support provided with stop pins which are located on the desired curve and spaced apart a distance corresponding to the spacing desired for such fasteners, and the yielding means will hold the movable members to the positions determined by said stop pins.

The punches, eyelet sets, and hook sets, may be actuated to cause them to perform their respective functions by an upwardly-moving member, herein shown as a plate, which through suitable mechanism is made to operate the said devices at the appropriate times, that is, when they occupy positions in alinement with the anvils, as will be hereinafter more particularly described; and under the embodiments of the invention selected for illustration, pressure blocks, or other suitable means, are arranged for movements toward and from the anvil plates, and serve to resist the pressure imparted thereto by the punches and sets.

Under another form of the invention the machine is constructed to set two different styles or sizes of eyelets simultaneously, as, for example, oval, or other irregularly shaped eyelets, and circular eyelets, the oval eyelet setting devices being preferably provided in two gangs and the circular eyelet setting device in a single gang located between the gangs of oval eyelet setting devices. Under this arrangement a shoe quarter may be presented to one of the gangs of oval eyelet setting devices, and to the gang of circular eyelet setting devices, and the machine will effect the simultaneous setting of the two kinds of eyelets therein, and, as in the preferred embodiment of the invention, the actuating mechanism of the machine is so constructed that during each cycle of the machine's operation the intermediate gang of setting devices will be operated simultaneously with one of the outer gang of setting devices, which latter are operated alternately, whereby the machine sets a plurality of the two kinds of eyelets, first in one half of the quarter, as the right half, and then in the other or left half of the quarter, as these parts of the shoe are presented alternately to the machine. It will be obvious, furthermore, that by merely changing the forms of the setting devices, the machine may operate in the same manner to secure in the stock a plurality of any kinds of eyelets that may be desired.

Other features of the invention, including important details of construction and combinations of parts, will be hereinafter more particularly described and claimed.

Figures 2, 3, 4:
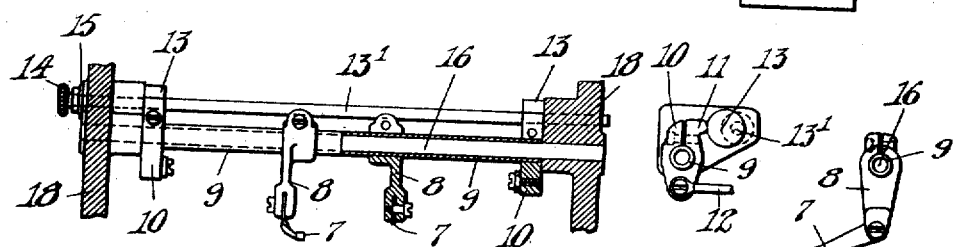
Figures 8, 9, 10, 11:
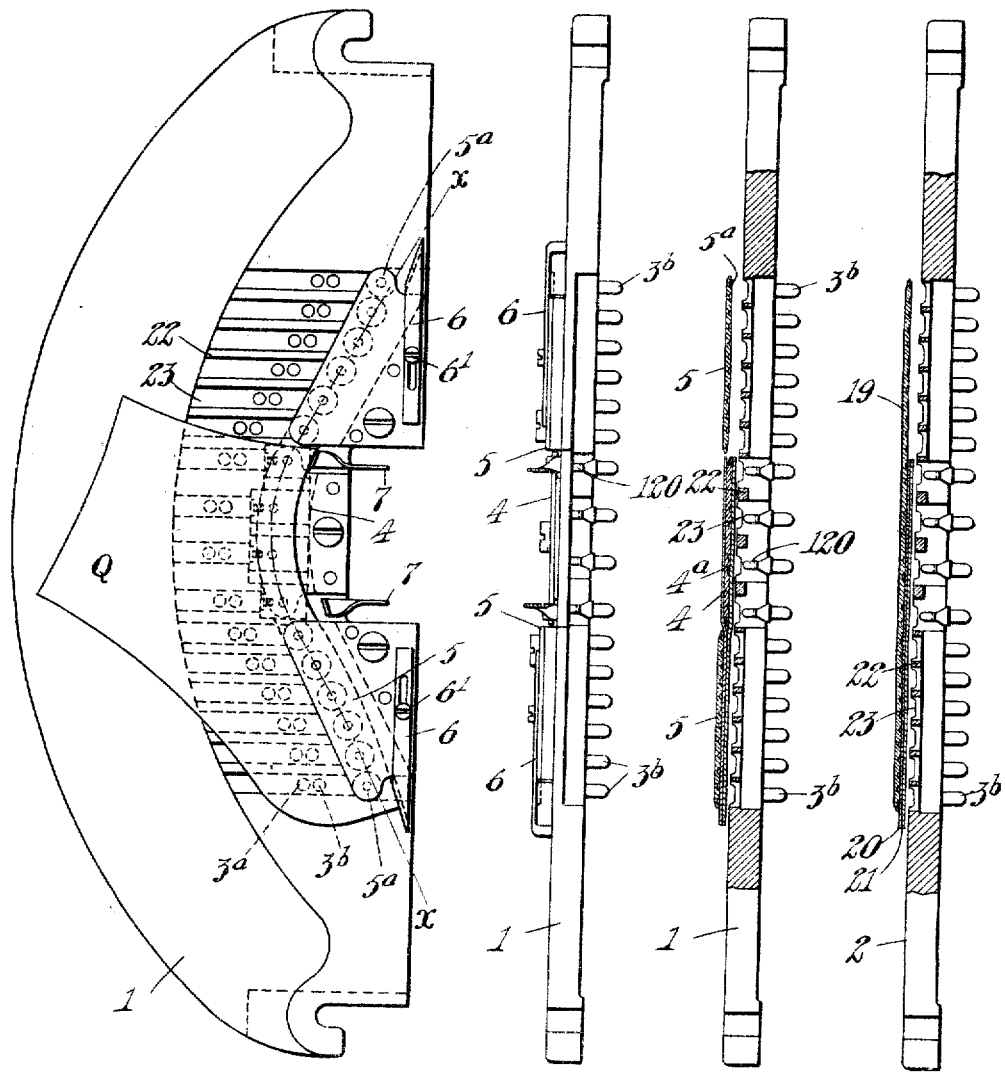
Figure 12:
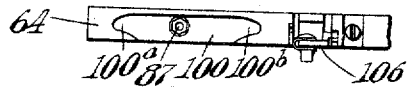
Figure 13:
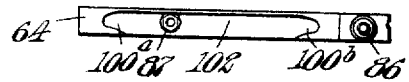
Figure 14:
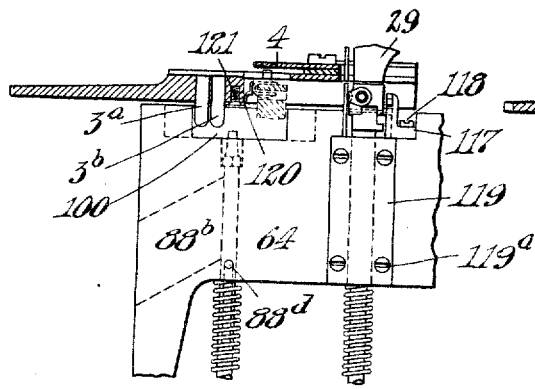
Figure 15:
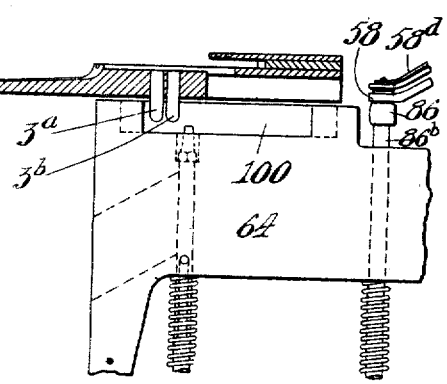
Figure 16:
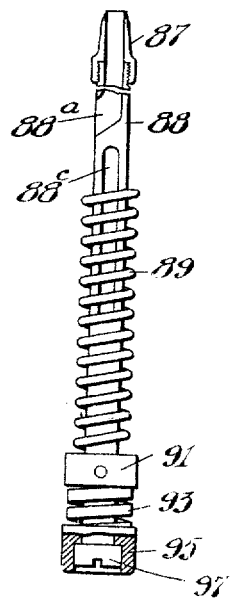
Figure 17:
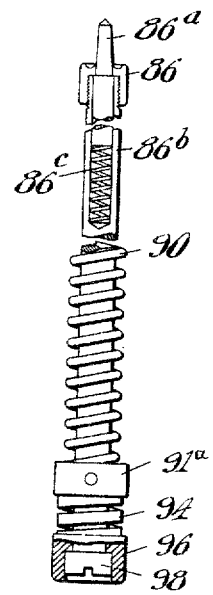
Figures 18, 19, 20:
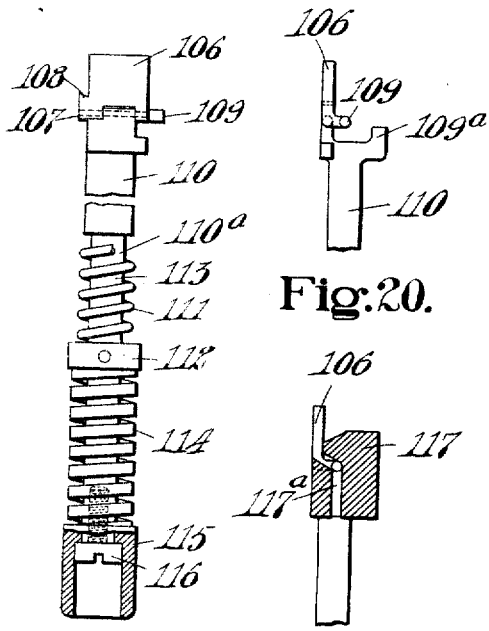
Figure 21:
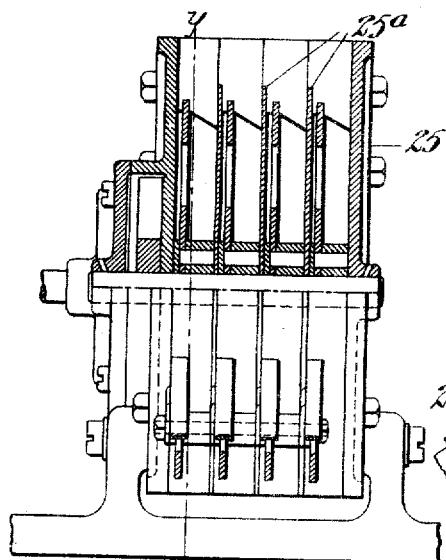
Figure 22:
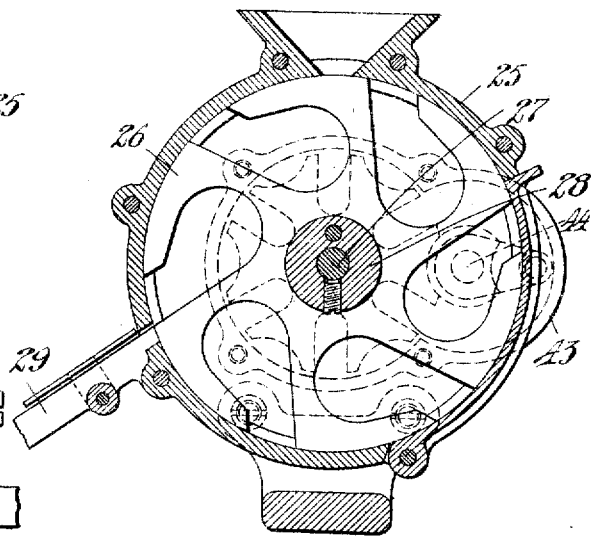
Figure 23:
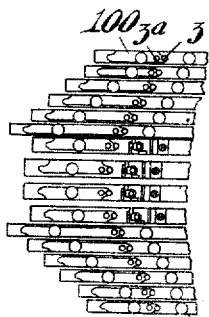
Figure 24:
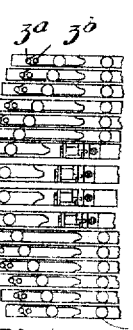
Figure 25:
Figure 26:
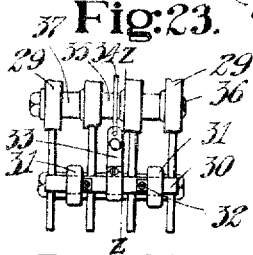
Figures 27, 28:
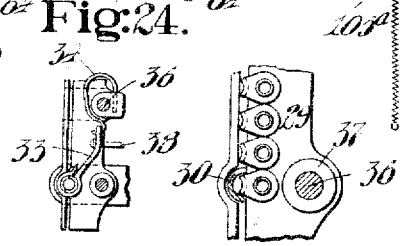
Figure 29:
Figure 32:
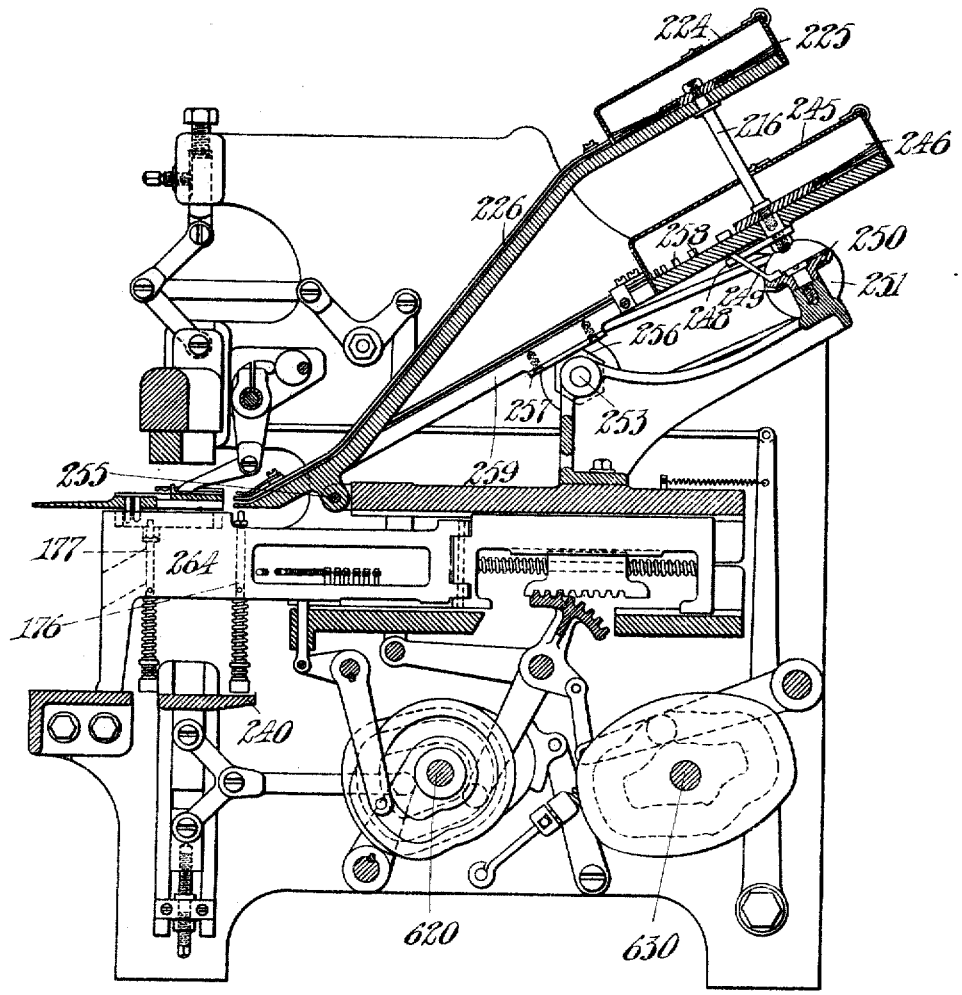
Figure 33:
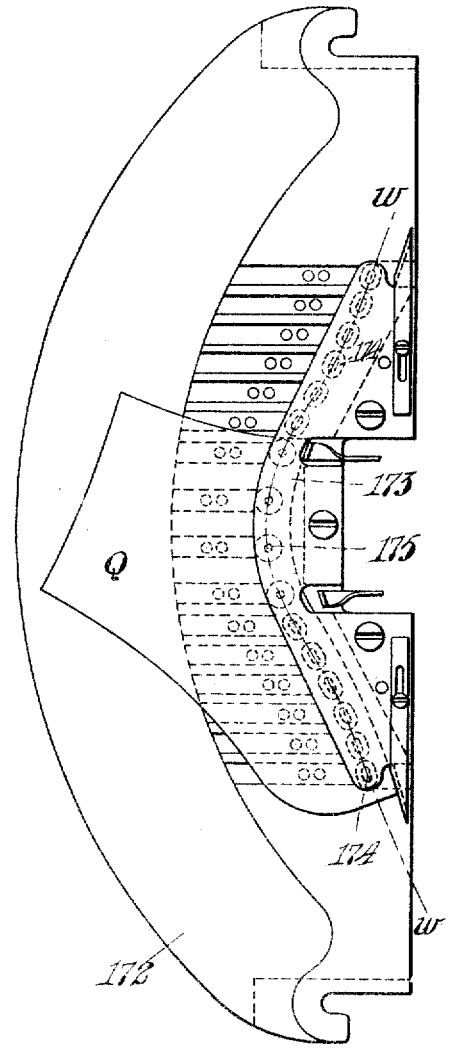
Figure 34:
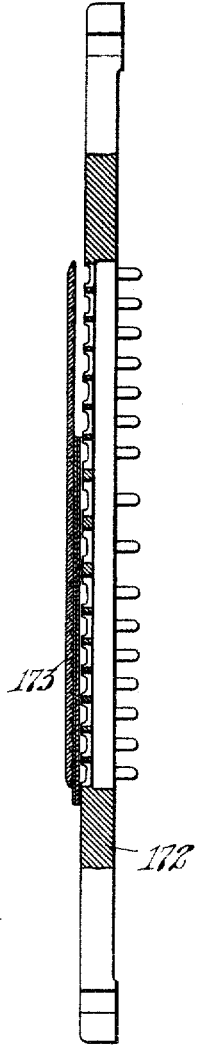
Figure 35:
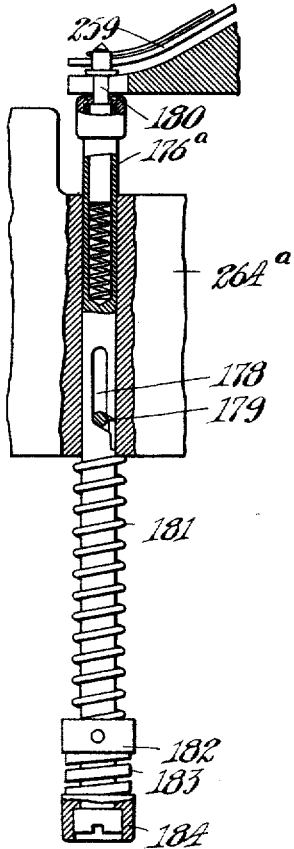

Figure 1 is a vertical longitudinal sectional view taken through the center of a machine illustrating one embodiment of this invention. Fig. 2 is a detail view, partly sectional, illustrating the movable gages and their controlling means. Fig. 3 is a detail view, in side elevation, of one of the gage-operating levers and its controlling means. Fig. 4 is a detail view showing one of the movable gages in side elevation. Fig. 5 is a detail view showing one of the controlling plates for the carriers. Fig. 6 is a view in elevation of the machine shown in Fig. 1, looking from the front. Fig. 7 is a view in elevation of the machine shown in Fig. 1, looking from the rear. Fig. 8 is a plan view of the work support, the anvils and associated parts, showing a shoe quarter in position. Fig. 9 is a view of the same parts in front elevation. Fig. 10 is a vertical sectional view taken on the line $x-x$, Fig. 8. Fig. 11 is a similar view illustrating a modification of the anvil plates. Fig. 12 is a detail view in plan showing a part of one of the hook set carriers. Fig. 13 is a similar view of one of the eyelet set carriers. Fig. 14 is a detail view in elevation, partly sectional, of the work support, anvil, and part of a hook set carrier, showing a hook set in hook-receiving, and also in hook-setting position. Fig. 15 is a similar view showing an eyelet set carrier with the set in eyelet-receiving position. Fig. 16 shows one of the punches and its springs in side elevation. Fig. 17 is a similar view of one of the eyelet sets. Fig. 18 is a similar view of one of the hook sets. Fig. 19 is a detail view, partly sectional, of a hook set bed plate, and the guiding means therefor. Fig. 20 is a detail view in elevation of a hook set and its bed plate. Fig. 21 is a view in elevation, partly in vertical transverse section, of the hopper for the lacing hooks. Fig. 22 is a longitudinal section of the lacing hook hopper, on the line $y-y$, Fig. 21. Fig. 23 is a diagrammatic view, illustrating the position occupied by the carriers when the hook sets and eyelet sets are in setting relation to the anvils. Fig. 24 is a diagrammatic view illustrating the position of the carriers when the punches are in operative relation to the anvils. Fig. 25 is a diagrammatic view illustrating the intermediate, or fastener-receiving position of the carriers. Fig. 26 is a detail view, in front elevation, of the hook separator and associated parts. Fig. 27 is a vertical transverse section, taken on the line $z-z$, Fig. 26, looking toward the left. Fig. 28 is a similar section, somewhat enlarged, taken on a plane to the left of the plane of Fig. 27, and showing the operative relation of the hook separator to the hooks in the raceway. Fig. 29 is an enlarged view, in transverse section, of the hook separator. Fig. 30 is a side elevation of the machine, illustrating a part of the clutch, and the clutch-controlling mechanism. Fig. 31 is a detail view showing the lower ends of the eyelet raceways. Fig. 32 is a longitudinal sectional view, similar to Fig. 1, illustrating a modified form of machine designed to set two different kinds of eyelets. Fig. 33 is a plan view of the work support, the anvils and associated parts for use in connection with such machine. Fig. 34 is a vertical sectional view taken on the line $w$—$w$, Fig. 33. Fig. 35 is a view in elevation, partly sectional, showing one of the sets for oval or other irregularly shaped eyelets located in eyelet-receiving position at the end of a raceway, and having an eyelet upon its spindle, together with a portion of the carrier for such set.

Referring to Figs. 1, 6, 7 and 30, the machine therein illustrated is shown as being supported upon a frame 18 which carries a main driving shaft 62. The driving shaft 62 carries a loose pulley 60, to be driven by a belt from any suitable source of power, and a clutch of any approved type may be employed to operatively connect said pulley and shaft. In Fig. 30 parts of a Horton clutch are shown, the usual roll collar of the clutch carrying two projections, 211 and 212, which are respectively arranged to engage a stop lever 206, shown as having a cushioning spring 206$^a$ to reduce the shock incident to arresting the movement of the parts. The lever 206 is pivoted at 208 to the machine frame, and as shown is held normally in position to be engaged by the projections, 211, or 212, by a spring 207, which connects said lever to the machine frame, a pin or other stop, 209, serving to limit the movements of the lever in opposition to said spring. A trip lever 205, having a shoulder 205$^a$, is pivoted at 215 to a controlling lever 201, which latter is pivoted at 202 to the frame, and may be connected by a rod 200, or the like, to a foot treadle or other suitable operating device, said controlling lever being maintained in the position shown by a spring 203, which holds one of its arms against a suitable stop 204. The shoulder of the trip lever is arranged to be normally maintained in engagement with an arm of the stop lever 206, by yielding means, as a spring 210, and an arm of said trip lever carries a lug 214 which is to be engaged by a cam 213, fast to a cam shaft 63.

When the parts are as shown in Fig. 30, the pulley 60 is loose on the shaft 62, the clutch rolls having been forced out of clutching engagement by the act of the projection 211, when the same came into contact with the spring on the end of the stop lever 206. If the operator steps on the treadle the controlling lever will be actuated to cause the trip lever to release the stop lever 206 from the projection 211, thereby permitting the clutch to act and to connect the loose pulley to shaft 62. Said shaft is then rotated, and, through a train of gears 240, 241 and 242, power is applied to the shaft 63, the arrangement being such that shaft 63 rotates once for every two rotations of the shaft 62. Shortly after the trip lever has released the clutch by moving the stop lever out of engagement with either of the projections 211 or 212, the shoulder 205$^a$ is automatically withdrawn from engagement with said stop lever by the cam 213, one of the several rises thereon coming in contact with the lug 214 on the trip lever as the shaft 63 rotates. The machine is thereby brought to a stop at certain times in its operation irrespective of whether the operator's foot remains on the treadle or not, such times being determined by the number and location of the rises on the cam 213.

Preferably, in connection with the clutch described, a brake such as illustrated in Fig. 1 is employed to arrest the rotation of shaft 62. The arm 219, which is pivoted at 220 to the machine frame, carries a brake shoe 218, which coöperates with a brake cam 217 fast on the shaft 62, the brake cam having a suitable number of rises which are arranged at the proper points thereon to agree with the projections 211 and 212. A rod 223, pivoted to the frame, carries a spring 221 which is connected with the arm 219 and acts thereon to set the brake, and the inward movement of said arm is limited by an adjustable stop collar 222, so that the brake is inoperative except when the rises on the cam 217 are opposite the brake shoe. The shafts 62, 63 carry the cams for imparting to the various elements of the machine their respective operations, the construction and arrangement of which cams will be hereinafter particularly described.

The work support 1, which is herein shown in the form of a plate, is securely fastened to the main frame 18 of the machine by screws or similar fastenings 147, and attached in suitable manner to the work support, under the embodiment shown in Figs. 8, 9 and 10, are the plates 4, 5, 5, having upon their under surfaces the depressions 4$^a$ and 5$^a$, respectively, said plates being spaced a distance above the surface of the work support, as will appear from Fig. 10. The depressions in the plates 4, 5, are to coöperate with the setting devices to be hereinafter described, and said plates are thereby made to constitute anvils. As will be seen, the anvil plate 4 is located intermediate the two anvil plates 5, 5, and said plate 4 is provided for coöperation with the hook sets, while the plates 5, 5, are provided for coöperation with the eyelet sets.

The arrangement shown in Figs. 8, 9 and 10 has for one of its objects the setting of blind hooks, or hooks that are secured to the leather part of the quarter only, being upset or clenched between the leather and lining, while the eyelets are set through both layers of the material. To this end, the anvil plates 5 have their lower surfaces spaced a greater distance from the work support than the lower surface of the plate 4, as will appear from Fig. 10, in which view is shown a shoe quarter with its leather under and its lining over the hook setting anvil plate 4, while both leather and lining are under one of the eyelet setting anvil plates 5. If it be desired, however, to set the hooks, as well as the eyelets, completely through both the leather and lining, a single anvil plate 19, as shown in Fig. 11, will be provided, whose setting depressions extend over all of the setting devices, and are arranged at substantially a uniform distance therefrom.

Referring to Figs. 8, 9 and 10, the work support 1 is shown as provided with a series of grooves 23 alternating with ribs 22, the grooves being located directly below the depressions in the anvil plates and serving to permit removal without obstruction of the quarter from the work support after the hooks and eyelets have been set. The work support is also provided with appropriate openings (see Figs. 14 and 15) directly below and in alinement with said depressions, for the entrance of the sets, and with the stop pins 3ª 3ᵇ, which are located below said grooves, and for a purpose to be hereinafter explained.

The anvil plates and the sets for the hooks and eyelets to coöperate therewith, are preferably arranged in the manner shown in order to provide for setting all the hooks and eyelets simultaneously, first upon a right hand quarter, and then upon a left hand quarter, and, as will be seen, the anvil plate 4 is used for both halves of a quarter, while the anvil plates 5, 5, are used alternately, the eyelets being set under one of the plates 5 for a right hand quarter and under the other of said plates for a left hand quarter. In connection with this arrangement, the gages 6, 6, may be provided to determine the position of the outer edges of the quarters, said gages being adjustable, as shown, by the set screws 6' which pass through slots in said gages and are in threaded engagement with the work support 1. The position of the inner, or rear edges of the quarters, may be conveniently determined by the movable gages 7, 7, which, as shown herein, are actuated by suitable mechanism so as to be alternately moved into, and out of, operative position, said mechanism being so timed that when the eyelet sets for a right quarter are actuated the gage 7 approximate thereto is advanced to position, and the other one of said gages is withdrawn to clear the quarter, and vice versa. Referring to Figs. 1, 2, 3 and 4, wherein this mechanism is illustrated, the numeral 16 indicates a rod whose ends are rigidly secured to the frame 18 of the machine, and loosely journaled on said rod are two sleeves 9, upon which are clamped the arms 8 to which are adjustably secured the gages 7. Levers 10, which are also clamped to the sleeves by suitable means, are formed or provided with the projections 11 at one end and at their opposite ends are loosely connected to links 12, which in turn are similarly connected to levers 140, the latter being pivoted to the machine frame at 141. The levers 140 carry rolls 142 which, as shown in Fig. 7, are arranged for operation by the cams 143, located on the shaft 63. In order to control the extent of the advance movement of the gages 7, stop devices, herein shown as eccentrics 13, are located in position to come in contact with the projections 11, said eccentrics being preferably mounted at opposite ends of a rod 13' which is journaled in the machine frame and has a handle 14, or other convenient means, whereby it may be turned to present different portions of the eccentrics to the projections. Yielding means, herein shown as springs 12ª, each having one end secured to a pin or other support 12ᵇ, and its opposite end secured to a lever 140, serve to normally exert a force tending to move the gages to their forward or operative positions, with the projections in contact with their respective eccentrics. By this construction it will be seen that on turning the handle 14 the projections 11 may be moved different distances from the axes of the eccentrics, and the amount of forward movement of the gages adjusted.

Referring to Figs. 1, 21 and 22, the numeral 25 indicates the hopper for the lacing hooks which is preferably divided by partitions 25ª into a plurality of compartments corresponding with the several raceways. As shown, each of these compartments has a picker plate 26 which is fast to a shaft 27 and rotates therewith, and a raceway 29 leading from each compartment is supplied with hooks by a picker plate, which separates them from the mass lying in the bottom of the hopper and deposits them on said raceway. The shaft 27 is shown as being arranged for intermittent rotation by a one tooth gear (see dotted lines Fig. 22), which is mounted on a shaft 44, said shaft being driven from a pulley 43 by a belt 43ª, which in turn is driven by a pulley on the shaft 53 receiving motion from the main shaft 62 through a pulley 58 and belt 59.

Referring to Figs. 1, and 26 to 29, inclusive, the numeral 30 indicates a separator for the lacing hooks, herein shown in the form of a tube and mounted in bearings 31 suitably located in the upper front portion of the machine frame and at a point near the discharge ends of the raceways 29, suitable means, as blocks 32, being preferably secured to the separator to prevent it from shifting laterally in its bearings. The tube 30 is cut away, or slotted, through a portion of its circumference at points corresponding with the location of each raceway 29, leaving sections 30ª, and the raceways are arranged in said slots in the manner shown in Fig. 28. By this construction, when the tube is oscillated, each section 30ª thereof acts as a separator, permitting one hook at a time to drop by gravity from a raceway to the setting mechanism at every oscillation.

The actuating mechanism for the separator comprises a lever 33 which is clamped thereto, and a rod 38 connected at one end to said lever and at its opposite end connected to a lever 39, pivoted to the machine frame at 40, and having an arm which carries a cam roll 42 to be operated by a cam 41 fast to the shaft 63. The separator lever 33 is cause to move in one direction by the cam 41, and in the opposite direction by a spring 34, which has an end secured to one of a series of spacing sleeves 35, located between the raceways 29 and on the shaft 36, and its other end secured to said lever.

The eyelets are supplied from a hopper 45, which may be of any desired type. As herein shown, it contains a brush 46 which is mounted to rotate with a stem 47 having secured thereto an arm 48 which is driven by an arm 48' carried by a bevel gear 49, the latter being driven by a pinion on a shaft 50, carrying a pulley 51 which receives motion from shaft 53 through a belt 52. The eyelets are forced by the brush through openings 58 in the side of the hopper, into the two sets of raceways 58ª and 58ᵇ, which lead, respectively, to the two gangs of eyelet setting devices. Near their lower ends the raceways of each of said gangs are supported by a bridge 58ᶜ, (Figs. 1 and 31), and the eyelets are retained in the raceways by a series of springs 58ᵈ, the free ends of which are preferably curved and bear against stop pins 58ᵉ. The eyelet raceways and hopper are, as shown, mounted for pivotal movements on the machine frame as indicated at 55, and may be oscillated about such pivot by cams 56 on the shaft 53, which act against wear plates 57 secured to the raceways.

The punches, hook sets, and eyelet sets, are supported for movements into and out of the appropriate positions for the punches to punch the stock, and for the several sets to receive hooks or eyelets from the raceways, and to set said hooks or eyelets, by a series of carriers, which are also constructed to permit adjustments to vary the lateral spacing of the fastenings. These carriers each consist of two members, the forward one of which, 64, carries the punches and sets and is movably connected to the rear member 65 in suitable manner, as by a pivot pin 66, said forward member being provided with an extension which is supported for free sliding movements upon a table 144 rigidly sustained by the machine frame.

The carriers are arranged to be moved in opposite directions relatively to the front of the machine by three segmental gears 75 which mesh with a plurality of racks 72, sliding on rods 74 supported by the rear members of the carriers, there being a rack for each carrier and a gear for each of the several groups of carriers which, respectively, support one of the gangs of setting devices. Spiral springs or other cushioning means 73 are mounted on the rods and serve to yieldingly oppose the movements of the racks 74 in opposite directions. One of the segmental gears and its rack is shown in Fig. 1 applied to a group of carriers, and it is to be understood that the others are substantial duplicates thereof. The several segmental gears are pivotally mounted on a shaft 76, secured to the machine frame, and have arms whereby said gears are connected through links 79 to levers 78, which latter carry cam rolls to coöperate with cam ways or grooves in three cams 77 fast on the shaft 63, a cam being provided for each gear 75.

The extreme forward and back, as well as the lateral positions, of the members 64 of the carriers are determined by the location of the several pairs of pins 3ª and 3ᵇ, secured to the work support, which enter recesses 100 in said members, as shown in Figs. 14 and 15. A series of springs 103 secured at one end to pins 105 on the frame, and at their opposite ends, 105ª, to said members, serve to yieldingly hold the members against the pins 3ª, 3ᵇ, which bear against the side walls of said recesses, as shown in Fig. 25. When that part of the recesses indicated at 100ª (Fig. 12) comes in contact with the pins 3ª, the carrier members 64 will be so positioned that the punches are located directly below the depressions in the anvil plates, as shown in Fig. 24, and when that part of the recesses indicated at 100ᵇ comes in contact with the pins 3ᵇ, said members will be so positioned that the hook sets and the eyelet sets are located directly under said depressions, as shown in Fig. 23. As the carriers must move different distances in order to position the sets for the hooks and eyelets along a line which agrees with the curvature of the front edge of a shoe quarter, certain of the carriers will be arrested in their movements by the stop pins in advance of other carriers, the springs 73 yielding to permit these differential movements. The work support 1 is removable and it is contemplated that it shall be interchangeable with other work supports having the stop pins thereon located on a different curve, or spaced different distances apart, so as to correspond with the desired spacings of the fasteners as well as the curve upon which they are to be set, in accordance with variations in the style and size of the shoe uppers or other articles to which the fasteners are to be applied.

The intermediate position of the carriers, or that in which the eyelets and hooks are picked off from the raceways and deposited in their respective sets, is controlled by a number of plates 80 secured to the carriers, and a like number of coöperating pins 81. These pins are operated through arms 81ª fast to a rock shaft 82 which is oscillated by an arm 83 carrying a cam roll 85 located in a cam way 84 of a cam fast to the shaft 62. When the hook sets and eyelet sets are moved to position under their respective raceways, the pins 81 are raised, by the mechanism described, and enter the recesses 80ª to thereby arrest the movement of the carriers until the hooks and eyelets have been picked off by their sets, when the pins are withdrawn and the carriers are free to move forward to setting position. The intermediate position of the carriers is illustrated in Figs. 14 and 15, and diagrammatically in Fig. 25.

Referring to Figs. 14 and 16, each of the punches comprises a plunger or body portion 88 and a punch head 87, in screw-threaded or other suitable engagement therewith, the plunger preferably having an opening 88ª to communicate with an opening 88ᵇ in the carrier, whereby to discharge the punched material. As shown herein, a groove 88ᶜ in the plunger engages a screw 88ᵈ in the carrier to guide the punch and to maintain the alinement of said openings. A spring 89 surrounds each plunger and is arranged to bear at its upper end against the carrier and at its lower end has bearing against a collar 91 fixed to the plunger, whereby the plunger is held normally within the carrier. The plunger at its lower end carries a head 97 above which is a sliding collar 95, and a strong spring 93 is confined between the two collars to provide a further cushioning means for the set plate 145, which actuates the punches and sets, the provision of such additional cushioning means serving to compensate for variations in the thickness of stock, or for any adjustments to vary the stroke of said plate.

Each of the eyelet sets, (see Fig. 17), comprises a plunger 86ᵇ to which is secured by threads, or equivalent means, the setting head 86, and a spindle 86ª, having a shoulder to engage the head, a spring 86ᶜ being confined in a recess in the plunger and acting to project the spindle to thereby cause said shoulder to bear against a shoulder on the head. The eyelet plunger is also provided with a spring 90, a fixed collar 91ª, a head 98, a sliding collar 96, and a strong spring 94, all of which are similar in construction and operation to like parts on the punch plungers.

The hook sets, as shown in Figs. 14, 18, 19 and 20, each comprise a plunger having a rectangular portion 110 and a cylindrical portion 110ª, the rectangular portion being arranged to slide in a passage way of similar form in the carrier member 64, to which the plunger may be confined by a plate 119 and fastenings 119ª. The plunger is provided with a spring 113, a fixed collar 112, head 116, sliding collar 115, and strong spring 114, similar in construction and operation to like parts in the punches and eyelet sets, but in this case the fixed collar is arranged a greater distance from the sliding collar on the plunger, and the strong spring 114 is lengthened somewhat, for a purpose to be described hereinafter. The setting head of the hook sets is preferably in the form of a bed plate 106, which is pivoted to the plunger and is formed with an angular arm having thereon a lug 109, to engage a cam slot or guideway 117ª in a block 117 which may be secured to one of the hook set carriers by a screw 118, or the like. The bed plate is furthermore constructed with a shoulder 108 which serves to arrest and properly position the hooks thereon as they are received from the raceway. Located at the upper extremity of the hook set plunger is an arm or bearing member 109ª to support the bed plate when the latter has been made to assume a horizontal position, or that in which the hooks are to be set against the anvil plate 4.

When the carriers have been moved into position to locate the hook sets beneath the raceways 29, the hook set plungers are lowered, and the bed plates 106 stand in vertical positions by reason of the location of the lugs 109 in the cam slots 117ª. The separator having released the hooks, the same then fall from the raceways upon the bed plates where they are retained by the shoulders 108, as shown in full lines in Fig. 14. The carriers are then advanced to position the sets beneath the depressions in the anvil plates and the sets are raised by the set plates 145, which thereby, through the cam slots 117ª and lugs 109, causes the bed plates carrying the hooks to turn and assume horizontal positions, as shown by dotted lines in Fig. 14, further upward movement of the sets serving to force the tubular shanks of the hooks through the holes previously punched in the stock, and to set the hooks against the anvil plates. Just previous to the setting operation, the hooks are brought into contact with locating springs 120, herein shown as secured to the work support 1 by screws 121, the continued upward movement of the plungers to set the hooks acting to force them beyond said springs. Inasmuch as the set plate 145 is employed to simultaneously actuate the hook setting plungers and the eyelet setting plungers, and the latter must move a slight distance in excess of the former to and from the anvils in the setting operations, the springs 114 are made longer than the springs 94 to provide for such excess motion. From this construction it follows that the springs 114 will continue to yield after the hooks have been set in order to maintain the hooks in contact with the anvil plate until the spindles 86ª are completely withdrawn from the eyelets which have been set.

The set plate 145 preferably moves in guideways 151 in the machine frame, and is actuated by toggles 146 through rods 148 which are connected with arms 149 keyed to a rockshaft 150, journaled in the machine frame, the rockshaft receiving motion from a cam 160, fast to the shaft 62, through an arm which carries a roll to engage said cam. The toggles 146 are preferably connected to adjustable steps 152, movable by screws 153 which are rotatable in bearings 154 secured to the frame of the machine, lock nuts 155 being provided to secure said screws, and hence the toggle steps, in adjusted position. The upward movements of the set plate, effected through the mechanism described, forces the punches and sets against the anvil plates, and in order to offer a suitable amount of resistance to the pressure against said plates, a series of blocks 166, 167 and 168 are provided, the same being secured in a slide 156, preferably in a manner to permit their adjustment or removal, in any approved manner. The slide 156 is mounted for sliding movements in ways 157 on the machine frame, and is actuated toward and from operative position over the anvil plates, when the punches and sets are raised, by toggles 158, through links 159 and bell-crank levers 161, pivoted at 162, links 163, arms 164, cam lever 164ª, and cam 165. The toggles 158 are shown as connected with steps 169 which are slidable in the machine frame, being adjustable therein by means of the screws 170 and set screws 171.

The movements of the various parts of the machine above described are so timed that, upon the completion of each setting operation, the set plate 145 is lowered part way, thereby relieving the pressure upon the sets and withdrawing the same a sufficient distance to permit the removal of the work. The operator then steps on the treadle to cause the clutch to connect the main shaft 62 and loose pulley, which starts the machine, during which time he may prepare another shoe quarter therefor; the sets continue their downward motion, and thereafter the carriers are moved to their extreme rear positions, bringing the punches in line with the depressions in the anvil plates, at which point the machine is brought to a stop. When the work is placed in position relatively, to the appropriate gages 6 and 7, as shown in Fig. 8, the operator steps on the treadle again to start the machine, and the set plate rises and forces the punches through the material of the quarter, and is then lowered to permit the punches to be withdrawn. The carriers for the hook sets and one gang of eyelet sets are then moved forward to intermediate position and are arrested by the pins 81, which engage the plates 80 for a sufficient time to permit the hooks and eyelets to be deposited upon the sets, the cam 160 being shaped to cause the sets to rise slightly at this time to permit the eyelets to be entered by the eyelet set spindles. The pins 81 are then withdrawn, the carriers are moved to their extreme forward position where the sets are below the depressions in the anvil plates, the set plate 145 again rises and sets the hooks and eyelets through the previously punched holes in the quarter, and is then lowered a sufficient distance to permit removal of the work, when the machine comes to a second stop. During the time that the eyelets are being set on a right hand quarter the eyelet carriers and sets for the left hand quarter are rendered inoperative, and vice versa. This result is accomplished by so shaping the ways or grooves in the cams 77 that the carriers for the gang of hook sets are advanced to receiving position and to setting position once for every cycle of the machine's operation, while each group of carriers for the gangs of eyelet sets is advanced to such positions; alternately, once for every two cycles of the machine's operation.

While in the preferred form of the invention as above described the machine embodies the combination of hook and eyelet setting devices which are so arranged as to carry out, in a practical manner, the desirable result of attaching to a shoe quarter its full equipment of lacing hooks and eyelets at a single operation, it is to be understood that many features of the invention are not limited to use in such combination, but are of general utility in machines for setting hooks, eyelets or other similar fasteners. It is also to be understood that this machine is not limited to use with any particular type of eyelet or lacing hook, as by simple changes in the forms of the raceways and sets, lacing hooks or eyelets of varying styles or shapes may be set.

In the modification illustrated in Figs.

32, 33, 34 and 35 of the drawings the machine is designed to set simultaneously a suitable number of oval or other irregularly shaped eyelets, like, for example, those described in connection with the machine covered by U. S. Letters Patent No. 880,376, dated February 25, 1908, and a suitable number of circular eyelets in a shoe upper. This machine may be the same in the construction and mode of operation of all of its principal parts as that shown in Figs. 1 to 31, inclusive, except for such changes in the forms of the hoppers, raceways, setting devices and punches as are required to enable the machine to set a plurality of different kinds of eyelets.

By reference to Fig. 32 it will be seen that the machine is provided with a hopper 224 to contain one kind of eyelets, as circular eyelets, and a hopper 245 to contain a different kind of eyelets, as oval eyelets. The hopper 224 has a number of openings leading to a series of raceways 226 which convey the eyelets to the point where a plurality of eyelet sets, constructed to set circular eyelets, are moved by the carriers 264. Each of these carriers sustains a punch 177 shaped to punch holes of appropriate shape for circular eyelets, and an eyelet set 176 therefor, constructed as shown in Fig. 17. These sets receive the eyelets from the ends of the raceways, and are then moved by their carriers to eyelet setting position beneath the depressions 175, in an anvil plate 173, (see Figs. 33 and 34).

The hopper 224 is shown as provided with the usual brush 225, for agitating the eyelets and sweeping them into the openings leading to the raceways, and the brush may be mounted upon a rotating rod 216, which is shown as extending within the hopper 245 wherein is located a brush, 246, also mounted on the rod. An extension of the rod 216 passes through the bottom of the hopper 245 and carries an arm 248, which, through an arm 249 secured to a bevel gear 250 to be driven from the main shaft of the machine, as in the preferred embodiment of the invention, effects a rotation of the brushes 225 and 246. The hopper 245 has openings 258 leading to the raceways 259, whose construction adapts them to receive and convey the oval eyelets from the hopper to the points where they are picked off from the ends of the raceways by spindles of the eyelet sets 176ª, (see Fig. 35), which are supported by two groups of carriers 264ª located on opposite sides of the carriers 264 for supporting the sets for the circular eyelets. The carriers 264ª also support punches shaped appropriately for punching oval holes in the stock, and the sets 176ª are constructed for receiving and setting oval eyelets, the eyelets being conveyed by the carriers from the ends of the raceways to setting position beneath the depressions 174 in the anvil plate 173.

The raceways 226 and 259 for the two kinds of eyelets are preferably sustained for pivotal movements on a pin or other rocking support 255, and the raceways 259 are provided with a wear plate 257 which is sustained by a cam 256 fast to a shaft 258, which is arranged to be rotated through suitable connections from the main shaft of the machine, as, for example, the connections described for rotating the shaft 58 in the preferred construction. The rod 216 forms a rigid connection between the hoppers 224 and 245, and the raceways 226 and 259 being likewise in rigid connection, respectively, with their hoppers, the rotation of the cam 256 will serve to impart oscillating movements to said hoppers and their raceways, and thereby agitate the eyelets and cause them to pass freely along the raceways to the points where they are to be picked off by the spindles of the sets.

Oval or other eyelets of similar irregular shape are conveniently fed from the raceways to the sets in a given position, as with their longer diameters approximately at right angles to the edge of the stock, and are required to be turned after leaving the raceways, and before being presented to the stock, appropriate distances in order that their longer diameters will be parallel, or in other predetermined angular relation with said edge. Under the embodiment of the invention now being described it is desired that the circular eyelets be set along the upper portion of the front edge of the quarters and that the oval eyelets be set along the lower portion of the front edge of the quarters. As will be seen from Fig. 33, the lower portion of this edge is curved to such a degree that as the setting devices approach it in a straight line the angular relation between the edge of the quarter and such line varies progressively. For this reason the oval eyelets must be turned varying distances before being presented to the quarters in order that their longer diameters will all lie parallel with said edge. To effect this turning of the eyelets after they are picked off from the ends of the raceways, I preferably employ eyelet sets of the form shown in Fig. 35, whose operation is substantially the same as the eyelet sets described in the Letters Patent above referred to. These sets each comprise a plunger having a cavity or bore within which slides a spring-pressed spindle 180, having an oval shape in cross section to agree with the shape of the eyelets. The plungers are mounted for free sliding movements in bores in their carriers, and are normally retracted therein a suitable distance by the springs 181, which as shown, are confined between the lower surface of the carrier and a collar 182 fixed to the plunger. Below the collar 182, is a strong spring 183, the same being confined between the first collar and a sliding collar 184 which is retained upon the plunger by a suitable enlargement, such as a screw-head. With the exception of the particular shape of the eyelet-set spindle, the parts just described are the same as those illustrated in Fig. 17. The turning of the plungers to effect the changes in the positions of the eyelets is accomplished by constructing each plunger with a groove 178, composed of two straight portions and an intermediate inclined portion, and by providing a pin 179, on each carrier, to enter and coöperate with the groove in its plunger.

When the plungers 176ª, through the set plate 240 and its actuating mechanism, are caused to rise in order that their spindles may pick the eyelets from the ends of the raceways 259, the distance traveled by the plungers is sufficient only to permit the pins 179 to move from the upper to the lower ends of the upper straight portions of slots 178, and hence no turning movements are imparted to the plungers. Upon the second upward movement of the plungers to effect the setting of the eyelets the plungers, during the part of such movement which is represented by the length of the upper straight portions of the slots, will be restrained from turning, but as soon as the inclined sections of the slots reach the pins, the plungers will be turned axially the appropriate distances to position the fasteners with their longer axes parallel with the edge of the stock, and the plungers will be held in the axial positions to which they have been turned, by the engagement of the lower straight portions of the slots with the pins during the final, or eyelet-clenching, part of their movement.

The shafts 620 and 630 correspond, respectively, with the shafts 62 and 63 of the machine illustrated in Figs. 1 to 30, inclusive, and the machine may be provided with the same form of controlling mechanism, and with the same cams and connections as the latter. The parts being so constructed and arranged, it follows that when the operator first steps on the treadle the group of carriers sustaining the gang of sets for circular eyelets together with a group of carriers sustaining one of the gangs of sets for oval eyelets will be moved rearwardly to position the punches thereon properly for punching holes in the stock, and when he again steps on the treadle the punches on said carriers will be actuated to punch the holes. Upon retraction of the punches, these carriers will next be moved to intermediate position to enable the sets to pick eyelets from the ends of their raceways, following which the carriers will be moved to position the sets beneath the depressions in the anvil plate; and, finally, the sets will be actuated to simultaneously force the circular eyelets and the oval eyelets through the punched holes, and to set them in the material of the quarters. The operator may then remove this quarter, present another quarter to the machine, and again actuate the treadle twice, at the points in the operation of the machine above described, whereupon the mechanism will automatically cause the carriers sustaining the gang of sets for the circular eyelets and the carriers sustaining the other gang of sets for oval eyelets to perform the same series of operations. It will thus be seen that first one and then the other quarter may be presented to the machine in alternation, and they will be supplied, in turn, with both kinds of eyelets whose relative positions thereon will be automatically controlled, the operator locating each quarter so presented to the appropriate set of gages therefor, as in the preferred construction heretofore described.

Having thus described my invention, what I claim as new and desire to secure by Letters Patent of the United States is:—

1. In a machine of the class described, the combination with devices for setting a gang of hooks, of devices for setting a gang of eyelets arranged in successive relation to the hook setting devices, said hook and eyelet setting devices being constructed for simultaneous operation.

2. In a machine of the class described, the combination with hook setting means and eyelet setting means arranged in successive relation and constructed and adapted for setting all of the hooks and eyelets in a shoe quarter at a single operation, of actuating mechanism for said means.

3. In a machine of the class described, the combination with means for setting a gang of hooks and means for setting a gang of eyelets in successive relation thereto along the front edge of a shoe quarter, of devices for respectively feeding hooks and eyelets to said means, and actuating mechanism constructed and arranged to cause the hooks and eyelets to be set at a single operation.

4. In a machine of the class described, the combination with a plurality of hook setting devices and a plurality of eyelet setting devices arranged in successive relation, of means for simultaneously operating said devices, and gaging means to position the work so that the hooks will be set in the upper portion and the eyelets in the lower portion of the front edge of a shoe quarter.

5. In a machine of the class described, the combination with a work support, of means for setting a gang of hooks and a gang of eyelets at a single operation in a shoe quarter, and means for so positioning the work relatively to the setting means that the hooks will be set along the upper portion of the edge of the quarter and the eyelets will be set along the lower portion of said edge.

6. In a machine of the class described, the combination with a work support, of a plurality of hook setting devices and a plurality of eyelet setting devices arranged for simultaneous operation, and means to so control the positions of the work that the hooks will be set in the upper portion and the eyelets in the lower portion of the front edge of a shoe quarter.

7. In a machine of the class described, the combination with a work support having anvils to coöperate with a series of hook sets and anvils to cooperate with a series of eyelet sets, the said sets and their anvils being so arranged that hooks will be set in the upper front edge and eyelets in the lower front edge of a shoe quarter, and means for simultaneously actuating all of said sets.

8. In a machine of the class described, the combination with a work support sustaining a plurality of anvils, of hook setting means and eyelet setting means arranged for simultaneous operation in connection therewith, and means to so control the position of the work relatively to said means that the hooks will be set in the upper portion and the eyelets in the lower portion of the front edge of a shoe quarter.

9. In a machine of the class described, the combination with means for simultaneously setting a plurality of hooks and a plurality of eyelets in a shoe quarter, of means for controlling the position of the upper relatively to said means so that the hooks will be set in the upper portion and the eyelets in the lower portion of the front edge of the quarter.

10. In a machine of the class described, the combination with a work support carrying separated means to coöperate, respectively, with two gangs of setting devices in clenching eyelets, and intermediate means to coöperate with a gang of setting devices in clenching hooks, of gangs of setting devices for the eyelets and hooks and mechanism to actuate the hook setting devices and one gang of eyelet setting devices during each operation of the machine, the gangs of eyelet setting devices being alternately actuated.

11. In a machine of the class described, the combination with a work support of spaced eyelet setting means and hook setting means intermediate said eyelet setting means, and means to simultaneously position a shoe quarter relatively to one of the eyelet setting means and the hook setting means.

12. In a machine of the class described, the combination with a work support, of spaced eyelet setting anvils and a hook setting anvil intermediate said eyelet setting anvils and having its hook-receiving face arranged below the plane thereof.

13. In a machine of the class described, the combination with a work support of spaced eyelet setting means and hook setting means intermediate said eyelet setting means, and gages to determine the position of a shoe quarter relatively to either of the eyelet setting means conjointly with the hook setting means.

14. In a machine of the class described, the combination with a work support, of spaced eyelet setting means and hook setting means intermediate said eyelet setting means, a gage for determining the position of a right quarter, a gage for determining the position of a left quarter, and mechanism for alternately moving said gages into and out of operative position.

15. In a machine of the class described, the combination with a work support, of spaced eyelet setting means and hook setting means intermediate said eyelet setting means, a gage for determining the position of a right quarter, a gage for determining the position of a left quarter, mechanism for actuating the hook setting means alternately with each of the eyelet setting means, and mechanism for alternately moving said gages into and out of operative position.

16. In a machine of the class described, the combination with a work support having its work-receiving face formed to permit the removal of work having fasteners set therein, of an anvil sustained by said work support and having its fastener-receiving surface facing toward said work support and spaced therefrom.

17. In a machine of the class described, the combination with a work support provided with grooves in the face thereof, of an anvil sustained by said work support and having its fastener-receiving surface opposed to said face and spaced therefrom.

18. In a machine of the class described, the combination with a work support provided with grooves in the face thereof, of anvils sustained by said work support and provided with depressions located in substantial alinement with and facing toward said grooves.

19. In a machine of the class described, the combination with a work support provided with grooves in the face thereof, of anvils sustained by said work support and provided with depressions located in substantial alinement with said grooves, and setting devices to coöperate with said depressions in setting fasteners.

20. In a machine of the class described, the combination with a work support and anvils sustained thereby, of hook setting devices and eyelet setting devices constructed for operation in connection with said anvils, the anvils for the hooks being spaced a different distance from the work support than the anvils for the eyelets to provide for setting hooks through the leather and for setting eyelets through the leather and lining of a shoe quarter.

21. In a machine of the class described, the combination with independent gages for determining the positions of right and left quarters relatively to a plurality of setting devices, of automatic mechanism for alternately moving said gages into and out of operative position, and means to control the amount of movement imparted to said gages by said mechanism.

22. In a machine of the class described, the combination with hook setting means and eyelet setting means arranged to set a plurality of hooks and a plurality of eyelets in successive relation, of mechanism for moving said means into setting position and for thereafter simultaneously actuating said means to set a plurality of hooks and a plurality of eyelets in stock at a single operation.

23. In a machine of the class described, the combination with a plurality of hook setting devices and a plurality of eyelet setting devices arranged in successive relation, of mechanism for moving said devices into setting position and for thereafter actuating said devices simultaneously to set a plurality of hooks and a plurality of eyelets in stock at a single operation.

24. In a machine of the class described, the combination with two gangs of eyelet sets and a gang of hook sets arranged between the gangs of eyelet sets, of means to alternately advance each gang of eyelet sets to setting position with the gang of hook sets and to actuate the sets when so advanced to set eyelets and hooks in stock.

25. A machine of the class described, having in combination, a plurality of carriers supporting a gang of eyelet sets, a plurality of carriers supporting a gang of hook sets, means for actuating said carriers to move the sets toward and from setting position, and means for actuating said sets to set eyelets and hooks in stock.

26. A machine of the class described, having in combination, a plurality of carriers supporting a gang of eyelet sets, a plurality of carriers supporting a gang of hook sets, means for actuating said carriers to move the sets toward and from setting position, and means for actuating said sets to simultaneously set eyelets and hooks in stock.

27. A machine of the class described, having in combination, a plurality of carriers supporting a gang of punches and eyelet sets, a plurality of carriers supporting a gang of punches and hook sets, means for actuating said carriers to move said punches and sets toward and from operative positions, and means for actuating said punches to punch the stock and thereafter to actuate said sets to set the eyelets and hooks in the punched holes.

28. In a machine of the class described, the combination with an anvil, of a raceway for supplying fasteners, a carrier member sustaining a punch and a setting device, mechanism for moving said carrier first to locate the punch in operative relation to the anvil, then to locate the setting device in position for receiving a fastener, and finally to locate said device in operative relation to the anvil, and means to actuate said punch and setting device.

29. In a machine of the class described, the combination with a work support, of carriers sustaining a gang of setting devices, yielding means for actuating said carriers to move said setting devices into and out of setting position, and means sustained by the work support for determining the extent of said movements.

30. In a machine of the class described, the combination with a work support, of a plurality of carriers each sustaining a punch and a setting device, yielding means for actuating said carriers to alternately move said punches and setting devices into and out of operative position relatively to the work support, and means sustained by said work support for determining said movements.

31. A machine of the class described, having in combination, a work support, a plurality of raceways to supply fasteners, a plurality of carriers each sustaining a setting device, yielding means for actuating said carriers to move the setting devices from fastener-receiving to fastener-setting position and vice versa, means on the work support to determine the fastener-setting position of the carriers, and means to determine the fastener-receiving position of the carriers.

32. A machine of the class described, having in combination, a work support, a plurality of raceways to supply fasteners, a plurality of carriers each sustaining a punch and a setting device, yielding means for actuating said carriers to move the punches in position to punch stock and to move the setting devices in position to receive fasteners and to set said fasteners in the punched holes, means on the work support to determine the stock-punching and fastener-setting positions, and movable means to determine the fastener-receiving position of the carriers.

33. In a machine of the class described, the combination with a work support, of carrier members supporting a gang of setting devices, said members being arranged for movements to carry the setting devices into and out of setting position and also for lateral movements to vary the spacing of the fasteners, and means to actuate said devices to set fasteners in stock.

34. In a machine of the class described, the combination with a work support, of carrier members supporting a gang of setting devices, said members being arranged for movements to carry the setting devices into and out of setting position and also for lateral movements to vary the spacing of the fasteners, means carried by said work support to control said movements, and means to actuate said devices to set fasteners in stock.

35. In a machine of the class described, the combination with a work support having a plurality of pairs of locating devices thereon, of movable carrier members supporting a gang of setting devices, each of said members having a recess to coöperate with a pair of said locating devices in controlling their movements, and yielding means for actuating said members.

36. In a machine of the class described, the combination with a work support having a plurality of pairs of pins thereon, of movable carrier members supporting a gang of setting devices, each of said members having a recess to coöperate with a pair of said pins in controlling their movements, yielding means acting transversely to the movements of the carrier members to maintain them in engagement with said pins, and means for actuating said members.

37. A machine of the class described, having in combination, a work support having a plurality of pairs of pins thereon, of movable carrier members each sustaining a punch and a setting device and constructed with a recess whose ends coöperate, respectively, with the members of a pair of said pins to determine the operative positions of said punch and device relatively to the work support, means for supplying fasteners to said devices, means to arrest the carriers in intermediate position to permit said carriers to receive fasteners, and means to actuate said members.

38. In a machine of the class described, the combination with a work support, of a gang of setting devices arranged to move varying distances relatively to said work support in passing from fastener-receiving to fastener-setting position, and means to actuate said devices to set fasteners in stock.

39. In a machine of the class described, the combination with a work support having means to position an upper thereon, of a gang of setting devices arranged to move varying distances relatively to said work support in passing from fastener-receiving to fastener-setting position, and means to actuate said devices to set fasteners in stock.

40. In a machine of the class described, the combination with a work support, of a gang of setting devices arranged to move varying distances relatively to said work support in passing from fastener-receiving to fastener-setting position, means to control the extent of movements of said devices, yielding means for effecting said movements, and means to actuate the setting devices to set fasteners in stock.

41. In a machine of the class described, the combination with a work support, of a gang of eyelet setting devices and a gang of hook setting devices arranged to move varying distances in passing from fastener-receiving to fastener-setting position, and means to actuate said devices to set fasteners in stock.

42. In a machine of the class described, the combination with a work support, of a gang of eyelet setting devices and a gang of hook setting devices, arranged to move varying distances in passing from fastener-receiving to fastener-setting positions, and means to actuate said devices to simultaneously set fasteners in stock.

43. In a machine of the class described, the combination with a work support, of a gang of eyelet setting devices and a gang of hook setting devices arranged for movements toward and from said work support, means to variably limit the extent of said movements to determine the setting position of said devices relatively to the edge of a quarter, yielding means to effect said movements, and means to actuate said devices to set fasteners in stock.

44. In a machine of the class described, a work support, a plurality of carriers each comprising a movable member supporting a guide, a rack movable thereon, yielding means interposed between the ends of said rack and said member, a gear for actuating said racks, and a second member pivotally connected to said first-named member and supporting a setting device, and means for actuating said devices to set fasteners in stock.

45. In a machine of the class described, an anvil, setting devices arranged for movements relatively to said anvil to set fasteners, mechanism for actuating said devices, a cross-head carrying blocks and arranged for movements toward and from said anvil to resist the pressure of the setting devices, and means for actuating said cross-head.

46. In a machine of the class described, an anvil, setting devices arranged for movements relatively to said anvil to set fasteners, mechanism for actuating said devices, a cross-head carrying blocks and arranged for movements toward and from said anvil to resist the pressure of the setting devices, means permitting the adjustment of said blocks, and means for actuating said cross-head.

47. In a machine of the class described, an anvil, carriers supporting punches and sets and movable to alternately position said punches and sets in operative relation to said anvil, mechanism for actuating the punches and sets whereby to punch stock and to set fasteners therein, and means rendered operative when the punches and sets are acting upon the stock to resist their pressure against said anvil.

48. In a machine of the class described, a support, a plunger movable therein and provided with a setting device, a spring surrounding said plunger and bearing against said support, a fixed collar on the plunger to confine said spring, a strong spring below said collar, a sliding collar below said strong spring, and means for confining the sliding collar to the plunger.

49. In a machine of the class described, an anvil, a support, a hook set and an eyelet set movable therein, said eyelet set having a projecting spindle, yielding means associated with each set to resist its setting movements, and actuating means to cause simultaneous movements of said sets, the parts being so arranged that the yielding means on the hook set will maintain the hook in contact with the anvil after the setting operation until said spindle has been withdrawn from the eyelet.

50. In a machine of the class described, a hook setting device comprising a plunger provided with a movable member arranged to receive hooks in one position and to set hooks in a different position, means for supporting said member when in setting position, and means in permanent engagement with said member and controlled by the movement of the plunger for actuating said member.

51. In a machine of the class described, a hook setting device comprising a plunger provided with a movable member arranged to receive hooks in one position and to set hooks in a different position, said member having a projection, and a guideway to engage said projection and arranged to effect movement of said member from hook-receiving to hook-setting position.

52. In a machine of the class described, a hook setting device comprising a movable plunger provided with an upstanding portion forming a rest, a plate hinged to said plunger and carrying an arm having a projection thereon, means engaging said projection and adapted to cause said member to assume a vertical position when receiving hooks and a horizontal position to engage said rest when setting hooks, and means for actuating said plunger.

53. In a machine of the class described, the combination with a support having a cam guideway, a plunger movable in said support and provided with a rest, a hook setting plate hinged to said plunger and having an angularly arranged projection to fit said guideway, and means for actuating said plunger, the parts being so arranged that when the plunger is withdrawn the plate will assume a vertical position to receive hooks, and when the plunger is advanced the plate will assume a horizontal position to set hooks and be supported in such position by said rest.

54. In a machine of the class described, the combination with a hook separator comprising a tubular member having a recess therein, of a raceway arranged in said recess, and means for oscillating said separator.

55. In a machine of the class described, the combination with a hook separator comprising a tubular member having a recess therein, of a raceway arranged in said recess, a lever connected with said separator whereby to actuate it in one direction, and yielding means for actuating it in the opposite direction.

56. In a machine of the class described, the combination with a hook separator comprising a tubular member constructed with a transverse recess extending part-way through said member, whereby to leave a segmental remaining portion, of a hook raceway arranged in said recess, and means for oscillating said separator to permit the escape of hooks, one at a time, from said raceway.

57. In a machine of the class described, a separator comprising a tubular member having a series of transverse recesses therein extending part-way through said member, means for rotatably supporting said separator, a series of raceways arranged in said recesses, a lever connected with said separator and with suitable operating mechanism whereby to move the separator in one direction, and yielding means connected with said lever to move said separator in the opposite direction.

58. In a machine of the class described, the combination of an anvil, setting devices movable relatively thereto, a plate having guiding means slidable in ways and arranged to operate said devices, toggles connected with said plate, suitable actuating means therefor, adjustable steps for said toggles, a pressure-resisting head slidable in ways and arranged for operation in connection with said anvil to resist the pressure of the setting devices, toggles connected with said head, suitable actuating means therefor, and adjustable steps for said toggles to vary the amount of resistance offered by said head.

59. A machine of the class described having in combination a work support sustaining an anvil, a series of raceways, a series of carriers each sustaining a setting device and capable of longitudinal movements to locate said devices for receiving fasteners or for setting fasteners and also capable of lateral adjustments, means on the work support to determine the fastener-setting and lateral positions of said carriers, and coöperating devices having a fixed relation with the raceways and adapted to arrest said carriers in position to permit the setting devices to receive fasteners irrespective of the lateral adjustments of the carriers.

60. A machine of the class described, having in combination a work support sustaining an anvil, a series of raceways, a series of carriers sustaining punches and setting devices and capable of longitudinal movements to locate said punches and setting devices below said anvil alternately, the carriers also being capable of lateral adjustments, means on the work support to determine the punching and fastener-setting positions of the carriers, and coöperating devices having a fixed relation with the raceways and adapted to arrest said carriers in position to permit the setting devices to receive fasteners irrespective of the lateral adjustments of the carriers.

61. In a machine of the class described, the combination of an anvil, a plurality of carriers, a punch and a setting device sustained by each carrier, raceways for supplying fasteners, mechanism for moving the carriers first to position the punches in operative relation to the anvil, then to locate the sets in position to receive eyelets from the raceways, and thereafter to position the sets in operative relation to the anvils, and mechanism to actuate the punches and sets.

62. In a machine of the class described, the combination with means for setting eyelets and lacing hooks in a predetermined relation on an upper, of mechanism acting automatically to control the setting of such fasteners in the same relation on opposite members of the upper as said members are alternately presented to the machine.

63. In a machine of the class described, the combination with means for simultaneously setting eyelets and lacing hooks in a predetermined relation on an upper, of mechanism acting automatically to control the setting of such fasteners in the same relation on opposite members of the upper as said members are alternately presented to the machine.

64. In a machine of the class described, the combination with means for simultaneously setting eyelets and lacing hooks in a predetermined relation on an upper, of automatically actuated gages to alternately position opposite members of the upper relatively to said means, and automatic mechanism to control the setting of such fasteners in the same relation on said members as they are alternately presented to the gages.

65. In a machine of the class described, the combination with an interchangeable work support, of carrier members supporting a plurality of setting devices, said interchangeable work support being constructed and arranged to determine the operative locations of the setting devices, whereby both the spacing of the fasteners and the character of the curve upon which they are set may be varied according to the nature of said interchangeable work support.

66. In a machine of the class described, the combination with a work support provided with grooves in its face, of an anvil sustained in spaced relation to said work support and having a surface formed to clench fasteners arranged in opposed relation to said grooves.

67. In a machine of the class described, the combination with a work support provided with grooves in its face adapted to permit the removal of work with fasteners set therein, of anvils supported in spaced relation to the work support and having clenching depressions located in substantial alinement with said grooves.

68. In a machine of the class described, the combination with a work support provided with grooves in its face adapted to permit the removal of work with fasteners set therein, of anvils provided with depressions located in substantial alinement with said grooves, and setting devices to coöperate with said depressions in setting fasteners.

69. In a machine of the class described, an anvil, a raceway for supplying hooks, a movable carrier having a cam guideway, a hook setting plunger arranged to reciprocate in the carrier and provided with a movable member having a projection to enter said guideway, means for reciprocating said plunger to cause said member to assume one position for receiving hooks from the raceway and to assume a different position for clenching the hooks against the anvil, and means for moving said carrier to alternately position said member in operative relation to the anvil and the raceway.

70. In a machine of the class described, the combination with a gang of eyelet setting devices, a gang of hook setting devices, and actuating means therefor, of means for determining the position of a shoe quarter relative to said devices, said devices being constructed and arranged to set the entire equipment of fasteners in the quarter at a single operation.

71. In a machine of the class described, the combination with eyelet setting means and hook setting means arranged for operation upon one shoe quarter, of other eyelet setting means arranged for operation with said hook setting means on the opposite quarters, and mechanism for alternately actuating each of said eyelet setting means with the hook setting means.

72. In a machine of the class described, the combination with a gang of eyelet sets and a gang of hook sets arranged for operation upon one shoe quarter, of a gang of eyelet sets arranged for operation with said hook sets upon the opposite quarter, and mechanism for alternately actuating each gang of eyelet sets with the gang of hook sets.

73. In a machine of the class described, the combination with a gang of eyelet sets and a gang of hook sets arranged for operation upon one shoe quarter, of a gang of eyelet sets arranged for operation with said hook sets upon the opposite quarter, mechanism for alternately actuating each gang of eyelet sets with the gang of hook sets, and gages automatically actuated to alternately position each quarter in appropriate relation to the sets which are in operation.

In testimony whereof I have signed my name to this specification in the presence of two subscribing witnesses.

RALPH C. SIMMONS.

Witnesses:
HERBERT W. KENWAY,
EMILE H. TARDIVEL.

It is hereby certified that in Letters Patent No. 1,117,711, granted November 17, 1914, upon the application of Ralph C. Simmons, of Beverly, Massachusetts, for an improvement in "Hook and Eyelet Setting Machines," errors appear in the printed specification requiring correction as follows: Page 5, line 66, for the word "approximate" read *appropriate;* page 7, line 122, for the word "plates" read *plate;* and that the said Letters Patent should be read with these corrections therein that the same may conform to the record of the case in the Patent Office.

Signed and sealed this 9th day of February, A. D., 1915.

[SEAL.]

J. T. NEWTON,
*Acting Commissioner of Patents.*